(12) United States Patent
Plivcic et al.

(10) Patent No.: US 7,505,820 B2
(45) Date of Patent: Mar. 17, 2009

(54) BACKUP CONTROL FOR SOLID STATE POWER CONTROLLER (SSPC)

(75) Inventors: Boris Plivcic, Oakville (CA); Zhenning Z. Liu, Mississauga (CA); Daniel G. Filimon, Richmondhill (CA); Wenjiang Yu, Mississauga (CA); Anita Ramroop, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 474 days.

(21) Appl. No.: 11/392,719

(22) Filed: Mar. 30, 2006

(65) Prior Publication Data

US 2007/0236852 A1 Oct. 11, 2007

(51) Int. Cl.
*G05B 11/01* (2006.01)
*G06F 1/00* (2006.01)
*G06F 11/30* (2006.01)
*H02J 1/10* (2006.01)

(52) U.S. Cl. .................. 700/22; 713/300; 713/310; 713/340; 307/43

(58) Field of Classification Search .............. 700/22; 713/300, 310, 340; 307/43
See application file for complete search history.

(56) References Cited

U.S. PATENT DOCUMENTS

| | | | |
|---|---|---|---|
| 4,837,552 A | 6/1989 | Vandemotter et al. | |
| 5,422,517 A | 6/1995 | Verney et al. | |
| 5,752,047 A | 5/1998 | Darty et al. | |
| 6,121,693 A | 9/2000 | Rock | |
| 6,470,224 B1 | 10/2002 | Drake et al. | |
| 6,557,170 B1 * | 4/2003 | Wilder et al. | 725/130 |
| 6,633,802 B2 | 10/2003 | Sodoski et al. | |
| 6,845,467 B1 | 1/2005 | Ditner et al. | |
| 6,856,045 B1 | 2/2005 | Beneditz et al. | |
| 7,007,179 B2 * | 2/2006 | Mares et al. | 713/310 |
| 2001/0047212 A1 * | 11/2001 | Hewlett et al. | 700/2 |
| 2002/0108065 A1 | 8/2002 | Mares | |
| 2003/0095367 A1 | 5/2003 | Mares et al. | |
| 2004/0156154 A1 | 8/2004 | Lazarovich et al. | |
| 2005/0052808 A1 | 3/2005 | Nguyen | |

FOREIGN PATENT DOCUMENTS

EP 0768192 A1 4/1997

\* cited by examiner

*Primary Examiner*—Albert DeCady
*Assistant Examiner*—Thomas H Stevens
(74) *Attorney, Agent, or Firm*—Oral Caglar, Esq.

(57) ABSTRACT

Redundant functionality is implemented in a control of solid state power switching controller (SSPC) (1) to ensure that each power switching channel operates according to a default configuration in case of failure. Each power switching channel in the SSPC includes a solid state switching device (SSSD) (120) that is controlled by a supervisory controller (10) to perform power switching functions for a corresponding load. The SSPC further includes a nonvolatile memory device (44) that stores default commands for controlling the SSSDs in case the SSPC enters into a backup mode, e.g., due to a failure in the supervisory controller. The nonvolatile memory device may be assembled on the same SSPC circuit board as the power switching channels, thereby ensuring that backup control is performed locally in the SSPC device.

14 Claims, 5 Drawing Sheets

BACKUP CONTROL FOR SOLID STATE POWER CONTROLLER (SSPC)

RELATED APPLICATIONS

This application is related to copending U.S. patent application Ser. No. 10/017,125, which was filed on Dec. 14, 2001 and published as U.S. patent application Ser. No. 2002/0108065 on Aug. 8, 2002, the entire contents of which are herein incorporated by reference.

FIELD OF THE INVENTION

The present invention relates to an electrical power distribution system utilizing a solid state power controller (SSPC). More particularly, the present invention is directed to providing backup control functionality for an SSPC.

BACKGROUND OF THE INVENTION

Conventional mechanical and electromechanical power switches suffer from disadvantages relating to high levels of noise and spike voltages that are generated when electrical loads are turned on/off. These problems can be overcome through the use of a solid state power controller (SSPC), i.e., an electrical power distribution apparatus utilizing one or more solid state switching devices. Furthermore, SSPCs have the advantages of occupying less space, being light-weight and being more reliable.

Generally, an SSPC may operate in one of two modes with respect to an electrical load: a power controller mode, and a circuit breaker mode. In the power controller mode, an SSPC is configured to turn power on and off for its electrical load based on control commands received, e.g., from a microcontroller. Alternatively, in the circuit breaker mode, an SSPC continuously applies power to the electrical load until corresponding load current becomes excessive, e.g., because of a short circuit, or an overload condition. When the SSPC is operating in the circuit breaker mode, it may be configured (e.g., by the microcontroller) to operate according to a particular load current level, such that the SSPC switches power off when the current in the electrical load exceeds the particular load current level.

SSPC technology can be used in various types of power distribution systems. For example, an aircraft may incorporate an SSPC-based Secondary Electrical Power Distribution System (SEPDS), which uses programmable SSPC devices in place of traditional electromechanical circuit breaker technology. This type of SEPDS provides benefits to the aircraft in terms of load management, fault isolation, diagnostic health monitoring, and improved flexibility to accommodate modifications and system upgrades.

However, an aircraft SEPDS is one example of a high-reliability system whose design requires redundancy to ensure that safety and reliability targets are met when the system is integrated. As such, there should be some redundancy or backup functionality provided for the control of SSPCs in such systems.

SUMMARY OF THE INVENTION

Exemplary embodiments of the present invention are directed to a power distribution apparatus, also referred to as a solid state power controller (SSPC), utilizing one or more solid state switching devices (SSSDs) with an architecture providing redundant control functionality. Each SSSD is configured to perform power switching functions for a respective electrical load. A supervisory controller controls the power switching functions by issuing control commands to the SSSDs. The power distribution apparatus further includes a nonvolatile memory for storing default commands for controlling the power switching functions in the event that the apparatus enters into a backup mode (e.g., due to a failure in the supervisory controller). Specifically, when the apparatus enters backup mode, the default commands are output from the nonvolatile memory to the various SSSDs.

According to an exemplary embodiment, the power distribution apparatus is assembled on an SSPC circuit board. Since the redundant control circuitry, including the nonvolatile memory device, is implemented on this SSPC circuit board, backup control is performed locally for the various SSSDs.

According to a further exemplary embodiment, the nonvolatile memory device receives commands from the supervisory controller, to be stored as default commands. The default commands may correspond to the commands most recently issued to the SSSDs, thereby allowing the SSSDs to lock into an existing configuration when backup mode is initiated. Alternatively, the supervisory controller may issue a set of default commands, which represent a predetermined risk-abating configuration for the SSSDs, to the nonvolatile memory device.

Furthermore, the supervisory controller may be monitored in order to detect failures or faults therein. In such an embodiment, the nonvolatile memory device may be configured to only store commands received during normal operation of the supervisory controller. Thus, during faulty operation of the supervisory controller, the nonvolatile memory device is prevented from storing any commands issued by the supervisory controller as default commands.

According to a further exemplary embodiment, the power distribution apparatus assembled on the SSPC board provides means to execute a Built-In-Test (BIT) function that may be used to periodically validate functionality of the redundant control circuitry and avoid possibilities for latent failures of the backup function.

With the redundant functionality, the power switching apparatus may be implemented in systems requiring high reliability. For instance, a power switching device, which is consistent with exemplary embodiments of the invention described herein, may be used as part of a secondary electric power distribution system (SEPDS) for an aircraft, or other vehicles.

DETAILED DESCRIPTION OF EXEMPLARY EMBODIMENTS

The present invention relates to the implementation of redundant control functionality in solid state power controllers (SSPCs). Such SSPCs may be implemented, e.g., in a power distribution system requiring high reliability, such as a Secondary Electrical Power Distribution System (SEPDS) in an aircraft.

Figure 1A:
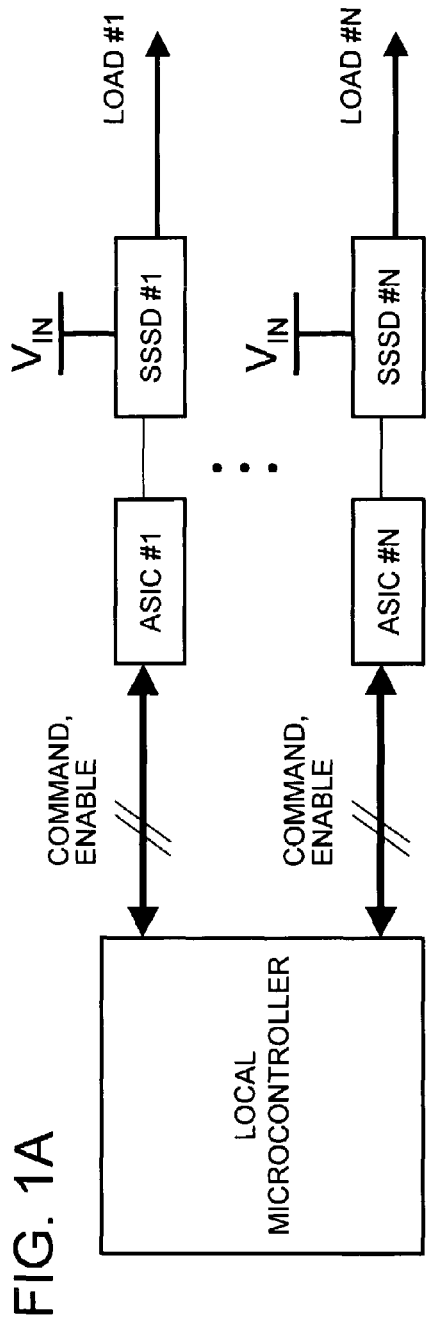
FIG. 1A is a block diagram illustrating the basic configuration of a solid state power controller (SSPC)

Generally speaking, an SSPC is an apparatus for distributing electrical power to one or more electrical loads via a corresponding set of one or more power switching channels. FIG. 1A illustrates the basic configuration of an SSPC. Specifically, the SSPC of FIG. 1A contains N power switching channels ($N \geq 1$) for distributing power to N respective electrical loads. As shown in this figure, each channel includes a solid state switching device (SSSD) configured perform power switching functions (i.e., turn power on and off) for the corresponding load. The SSSD generally utilizes MOSFET technology, such as a MOSFET switch or transistor, to perform the power switching functions.

According to a power control mode of the SSPC in FIG. 1A, each SSSD performs power switching for the corresponding load based on control commands received from a local microcontroller. In particular, as illustrated in FIG. 1A, the SSPC may contain up to N power switching channels ($N \geq 1$), each power switching channel corresponding to a particular SSSD. In addition, each power switching channel may further include an application specific integrated circuit (ASIC), which interfaces the corresponding SSSD to the local microcontroller.

In each power switching channel, the ASIC may perform a combination of load switching and protective functions. For instance, to operate the channel according to power control mode, the ASIC may perform the following functions for the corresponding SSSD: control switch drivers, compensate for temperature and aging of the SSSD, and control the rate of change of load current during switching (e.g., perform soft switching for DC loads, switch power on/off at the zero-crossings of voltage/current for AC loads). The ASIC may also perform functions related to the circuit breaker mode of operation (i.e. wire protection), as well as other functions, e.g., monitoring and reporting load current, and enacting fast shut down of the SSSD when the current reaches a certain level.

Referring again to FIG. 1A, each SSPC may be implemented as a circuit card assembly. For instance, the SSPC components (local microcontroller, ASICs, SSSDs, etc.) may be assembled on the same circuit board. The resultant circuit card may also include interface circuitry (not shown) that allows the SSPC to communicate with an external control device or computer.

Reference will now be made to copending U.S. patent application Ser. No. 10/017,125 (hereafter "the '125 application"), published as U.S. Patent Application Publication No. 2002/0108065, the entire contents of which are herein incorporated by reference. Specifically, the '125 application provides an example of a load management system, in which an SSPC circuit card receives instructions from a gateway module (not shown) via a serial databus (not shown). Based on the received instructions, the local microcontroller on the SSPC card issues commands to the various ASICs in order to control the operation of the corresponding SSSDs.

Figure 1B:
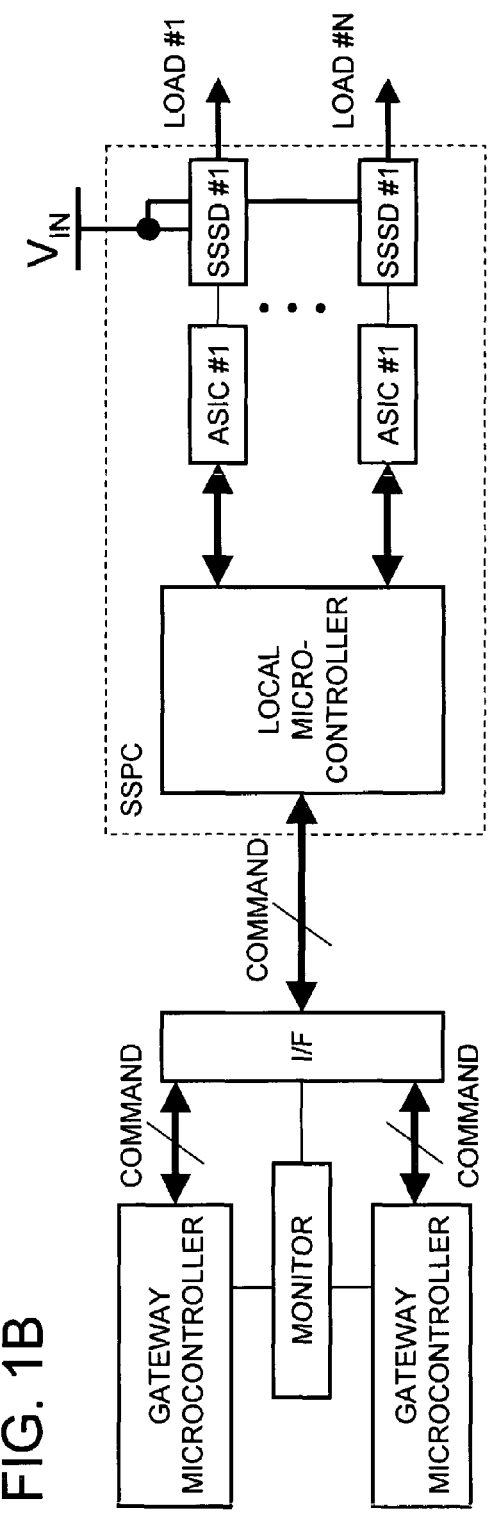
FIG. 1B is a block diagram illustrating redundant functionality within a power distribution system.

It is contemplated that the load management system described in the '125 application would be implemented in applications requiring high reliability, e.g., the power management system of a large aircraft. Accordingly, the '125 application describes means for implementing redundant functionality. FIG. 1B provides a simplified illustration of the redundant functionality described in the '125 application.

In FIG. 1B, a pair of microcontrollers ("gateway microcontrollers") are installed in the system. Each gateway microcontroller is connected to the serial bus via a bus interface ("I/F"). FIG. 1B further shows that a monitor circuit is provided for detecting failures in the gateway microcontrollers. When one gateway microcontroller fails, the monitor circuit can instruct the bus interface that the other gateway microcontroller is in control. In response to this instruction, the bus interface allows the other gateway microcontroller to transmit instructions onto the bus. Thus, the SSPCs receive control instructions from the serial bus, despite a gateway microcontroller failure.

However, the redundant configuration of FIG. 1B only addresses "high-level" failures, i.e., those occurring at a gateway microcontroller. Accordingly, the redundant functionality in FIG. 1B does not address failures that occur locally within an SSPC device, e.g., at the local microcontroller.

Figure 2:
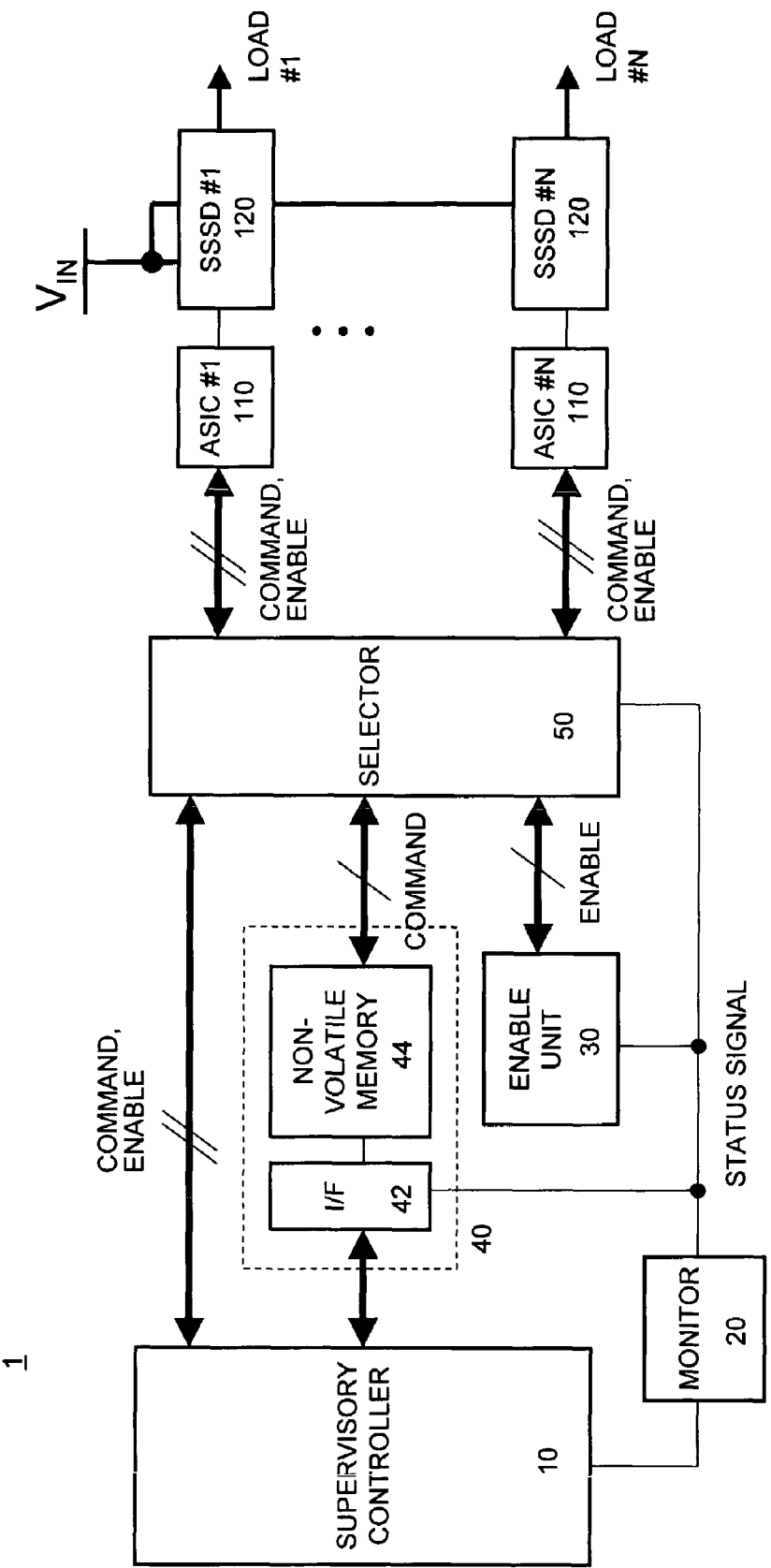
FIG. 2 is a block diagram illustrating a solid state power controller (SSPC) with redundant functionality, according to an exemplary embodiment of the present invention.

Accordingly, an exemplary embodiment of the present invention is directed to an SSPC in which redundant functionality is provided locally. In such an embodiment, the circuitry providing redundant functionality may be assembled directly on the SSPC circuit board. FIG. 2 is a block diagram illustrating an SSPC 1 equipped with such redundant functionality.

As shown in FIG. 2, a supervisory controller 10 is connected to the default storage unit 40 via a bus (e.g., serial databus). The default storage unit 40 is comprised of the interface unit 42 and the nonvolatile memory device 44. A pair of signal buses connects the supervisory controller 10 and default storage unit 40 to the input side of a selector unit 50. Also, an enable unit 30 is connected to the input side of the selector unit 50 via a signal bus.

In FIG. 2, the output side of the selector unit 50 is connected to a set of N power switching channels (also referred to herein as "SSPC channels") via a corresponding set of N buses. Each power switching channel includes an application specific integrated circuit (ASIC) 110, a solid state switching device (SSSD) 120, and any other necessary circuitry (not shown) for performing power switching functions for a particular electric load. For instance, as shown in FIG. 2, the nth power switching channel ($1 \leq n \leq N$) includes ASIC #n and SSSD #n, which are configured to selectively switch on and off power from a supplied voltage ($V_{IN}$) for the corresponding electric load, i.e., Load #n.

FIG. 2 further illustrates a monitor unit 20 connected to the supervisory controller 10. The monitor unit 20 also includes connections to enable unit 30, default storage unit 40, and selector unit 50 for transmitting a status signal. Also, as shown in FIG. 2, the enable unit 30 is connected to the input side of the selector unit 50 via a signal bus.

The operation of the SSPC 1, which is illustrated in FIG. 2, will now be described. According to an exemplary embodiment, this SSPC 1 may be assembled on a circuit board. In such an embodiment, the supervisory controller 10 may comprise a local microcontroller installed on the SSPC circuit card.

Figure 3:
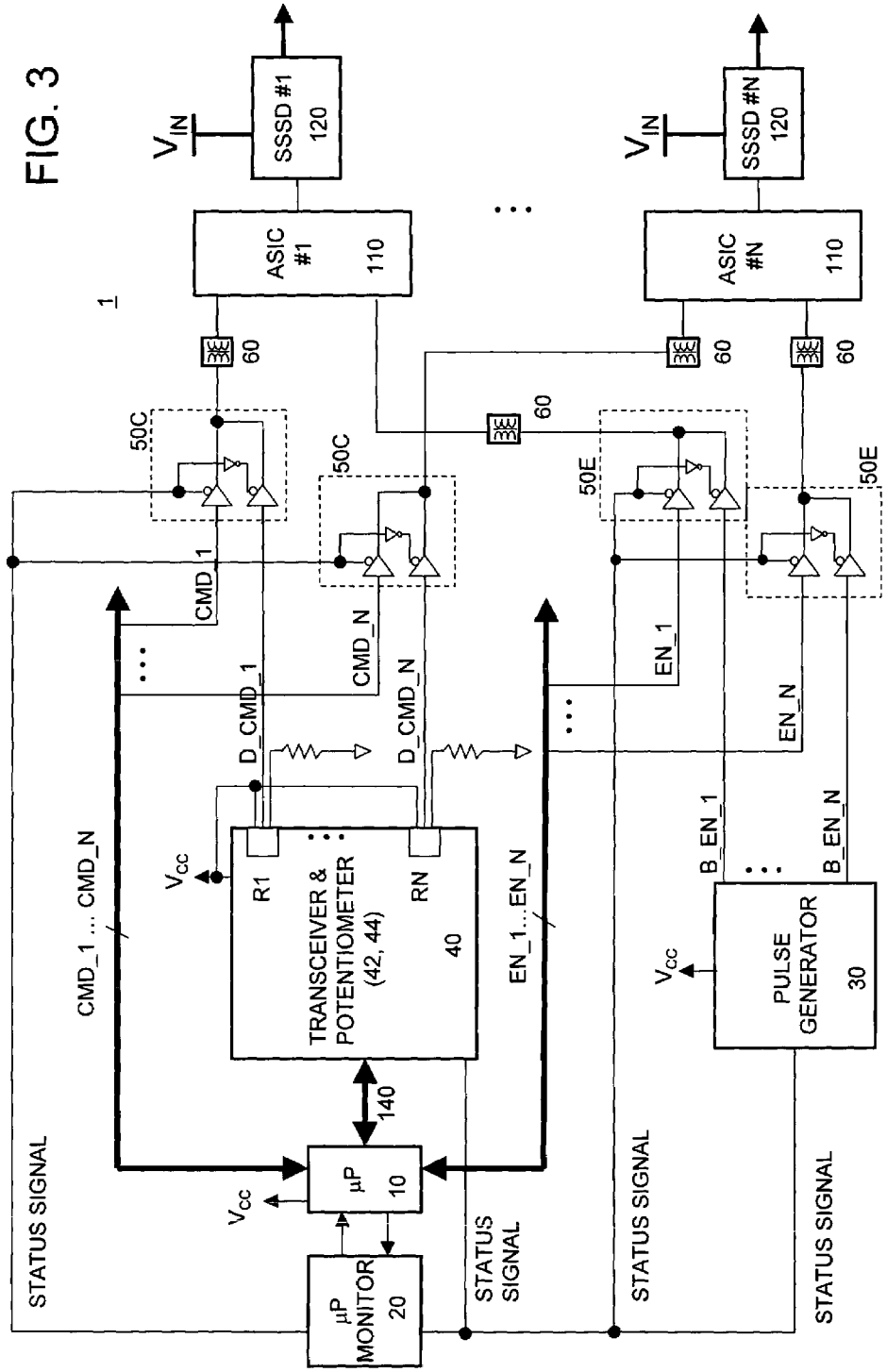
FIG. 3 illustrates a particular implementation of the SSPC in FIG. 2, according to an exemplary embodiment of the present invention.

In an exemplary embodiment, the supervisory controller 10 is configured to issue control commands to the various power switching channels #1 . . . #N. As shown in FIG. 2, the supervisory controller 10 may transmit such commands onto the bus, which connects the supervisory controller 10 to the input selector unit 50. The supervisory controller 10 may also be responsible for generating "enable" signals for the respective power switching channels. These enable signals may comprise a set of N control signals, each for enabling (i.e., activating) a respective one of the N power switching channels. As shown in FIG. 2, these enable signals are also be sent from the supervisory controller 10 to the input side of the selector unit 50 via a signal bus. Although FIG. 2 illustrates that the supervisory controller 10 uses the same signal bus to transmit both control command signals and enable signals to the selector unit 50, it should be noted separate buses may be used for transmitting each type of signal (e.g., as shown in FIG. 3).

According to an exemplary embodiment, the supervisory controller 10 is further configured to communicate with an external computer or other control device (not shown), e.g., one or more gateway microcontrollers. For instance, such communications may be facilitated by a serial databus (not shown). Thus, the supervisory controller 10 may receive instructions from the external computer or control device regarding, and issue control commands to the respective SSPC channels in accordance with such instructions.

However, the supervisory controller 10 may also be configured to issue control commands to the SSPC channels, without receiving explicit instructions from an external computer or device. For example, the supervisory controller 10 may be configured to issue certain types of commands when a system failure (e.g., in a gateway module or databus) prevents the supervisory controller 10 from receiving instructions from an external source.

Although the supervisory controller 10 is characterized as a local microcontroller in the above exemplary embodiment, it should be noted that alternative embodiments are possible. For instance, it is contemplated that the SSPC circuit card might not have a local microcontroller. In such an embodiment, an external computer or control device may perform the functions of the supervisory controller 10.

Referring again to FIG. 2, in addition to issuing commands to the SSPC channels via selector unit 50, the supervisory controller 10 is also configured to send commands to the default storage unit 40. For instance, the supervisory controller 10 may transmit such commands to the interface unit 42 via a serial databus.

According to an exemplary embodiment, the interface 42 is operable to receive data (e.g., command signal) from the supervisory controller 10 via the serial bus, and cause the data to be written to the nonvolatile memory device 44. However, this interface unit 42 may be configured as a transceiver that facilitates bi-directional communications between the supervisory controller 10 and nonvolatile memory device 44. For instance, the interface unit 42 might also be configured to read data out of the nonvolatile memory, and send the data to the supervisory controller 10 via the serial bus. The interface unit 42 may selectively perform write or read operations on the nonvolatile memory based on a received control signal(s) (not shown).

The nonvolatile memory device 44 may comprise a nonvolatile memory chip (e.g., digital potentiometer with nonvolatile storage), or another type of memory device modified to function as a nonvolatile memory. Using such a nonvolatile memory device 44 to store default commands for the SSPC channels helps protect against changes in the memory state (i.e., changes to the stored default command) that might otherwise be caused by interruptions on the nonvolatile memory device's 44 power supply (not shown).

According to an exemplary embodiment, the nonvolatile memory device 44 has a plurality of storage registers (not shown). Specifically, the nonvolatile memory device 44 may have N registers that correspond to the N power switching channels, respectively, of the SSPC 1. In such an embodiment, each register is configured to store the default command for the corresponding SSPC channel.

According to an exemplary embodiment, each default command represents a default state of operation for the corresponding SSPC channel in the event that the SSPC 1 enters a "backup mode." Generally, the backup mode of the SSPC 1 will be initiated due to a detected failure in the supervisory controller 10 (as will be described in more detail below). However, the backup mode may also be initiated externally. For instance, the backup mode may be initiated by an external fail-safe mechanism (e.g., a gateway module), or by a system operator.

In an exemplary embodiment, the supervisory controller 10 sends to the nonvolatile memory device 44 a set of default commands representing a predetermined risk-abating configuration for the N power switching channels in the SSPC 1. This risk-abating configuration is designed to safely maintain the SSPC channels, so that the channels will not exhibit unpredictable behavior in the event that a failure occurs in the supervisory controller 10.

However, in an alternative embodiment, the supervisory controller 10 may transmit commands to the default storage unit 40 corresponding to the same commands sent to the SSPC channels via the selector unit 50. In other words, the nonvolatile memory device 44 stores the command signals most recently issued by the supervisory controller 10 to the various SSSDs 120 during normal mode. Thus, according to this embodiment, the default commands are designed to lock the SSSDs into an existing configuration in the event that the backup mode is initiated.

According to an exemplary embodiment, in the event that a failure in the supervisory controller 10 is detected, the default storage unit 40 is prevented from storing any new commands issued by the faulty supervisory controller 10. Specifically, the interface unit 42 may prohibit new commands from being written to the nonvolatile memory device 44 after being notified (via status signal) that the SSPC 1 is in backup mode. Thus, default commands are written to the nonvolatile memory device 44 only while the supervisory controller 10 is operating normally. In an exemplary embodiment, the detection of failures in the supervisory controller 10 is a function of the monitor unit 20, which will be described in more detail below. The monitor unit 20 may also be operable to detect successful recovery of the supervisory controller 10, and restore normal functionality to the supervisory controller 10 in response thereto, according to a further exemplary embodiment.

Referring again to FIG. 2, in addition to the supervisory controller 10, the enable unit 30 also generates a set of N enable signals. Specifically, the enable signals generated by the enable unit 30 are for enabling or activating the N power switching channels, respectively, while the SSPC 1 operates in backup mode. These enable signals (referred to herein as "backup enable signals") are sent from the enable unit 30 to the input side of the selector unit 50 via a bus. Thus, after backup mode is initiated, the selector unit 50 selects the backup enable signals to be provided to the respective SSPC channels via the output side buses.

The purpose of the enable signals is to minimize the occurrence of a "false" turn on/off due to the potential effects of electromagnetic interference (EMI) on the SSPC circuit board.

As described above, the selector unit 50 receives two sets of command signals at the input side: the commands from supervisory controller 10, and the default commands from default storage unit 40. The selector unit 50 similarly receives two sets of enable signals at the input side: the enable signals generated by supervisory controller 10, and the enable signals generated by enable unit 30.

According to an exemplary embodiment, the selector unit 50 is configured to select which received sets of command signals and enable signals, respectively, are output to the power switching channels based on the current operating mode (normal or backup) of the SSPC 1. Accordingly, the selector unit 50 receives the status signal to determine which sets of command and enable signals are to be selected.

As shown in FIG. 2, the monitor unit 20 is responsible for generating the status signal. In an exemplary embodiment, the monitor unit 20 monitors the status of the supervisory controller 10 to detect faults or failure conditions arising therein. The status signal provides the monitoring results. Thus, the status signal is indicative of the current mode of operation, i.e., whether the supervisory controller 10 or default storage unit 40 is controlling the SSPC channels.

To perform its functions, the monitor unit 20 may be configured to receive signals from the supervisory controller 10 used for monitoring the "health" or "sanity" of the controller, and send signals to the supervisory controller 10 (e.g., to notify the supervisory controller 10 of a switchover to backup mode). Thus, the connection between the supervisory controller 10 and monitor unit 20 in FIG. 2 may be configured for transferring signals bi-directionally.

For example, when the SSPC is to be switched over to backup mode, the monitor unit 20 may transmit a control signal causing the supervisory controller 10 to lock into a failure mode, whereby the supervisory controller 10 is prevented from sending commands to the SSPC channels and/or writing commands to the nonvolatile memory device 44.

However, when the monitor unit 20 is notified that the supervisory controller 10 has successfully recovered from the fault or failure, the monitor unit 20 may send another control signal to unlock the supervisory controller 10 from this failure mode. This functionality of the monitor unit 20 (i.e., the ability to unlock the supervisory controller 10 to resume control after confirmation of successful recovery) also enables periodic maintenance tests to be performed. These tests, referred herein as Built-In-Tests (BITs) are designed to validate the proper functionality of the redundant control circuitry in the SSPC.

According to another exemplary embodiment, the monitor unit 20 may also be configured to receive notification (not shown) of an external initiation of the backup mode. For instance, the monitor unit 20 may receive instructions for initiating backup mode from an external device, or from the supervisory controller 10. Thus, the status signal may further be designed to indicate an external initiation of the backup mode. However, it should be noted that implementation of the externally initiated backup is optional and depends on the system requirements.

Figure 6:
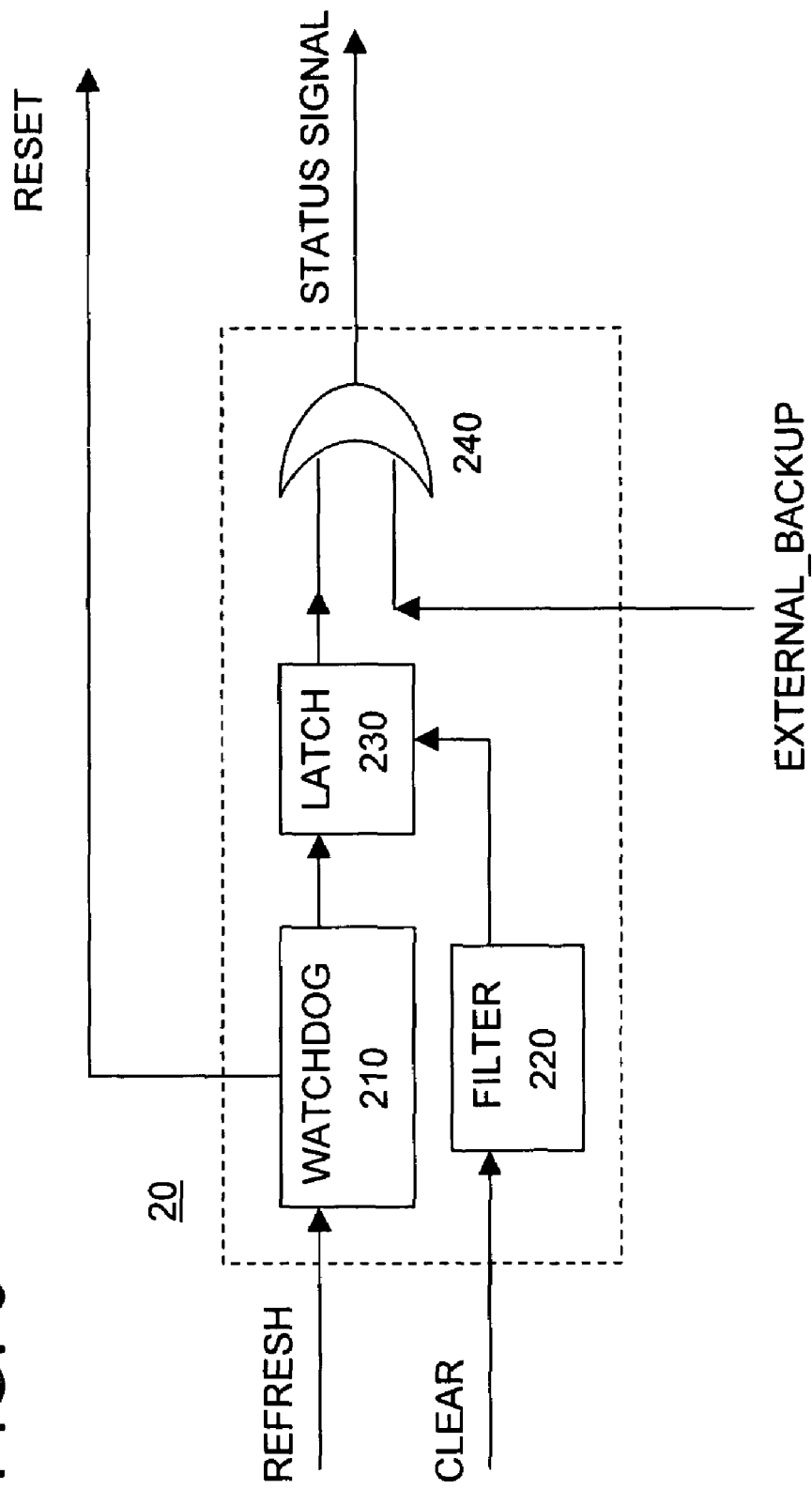
FIG. 6 is a block diagram illustrating a monitor unit for initiating backup functionality as well as means of executing a Built-In-Test (BIT).

FIG. 6 illustrates a functional block diagram of the monitor unit 20 according to an exemplary embodiment. As shown in this figure, the monitor unit 20 may include a watchdog circuit 210 for receiving a refresh signal from the supervisory controller 10. The watchdog circuit outputs a reset signal to the supervisory controller 10. In FIG. 6, the monitor unit 20 also includes a filter mechanism 220 that receives a clear signal. As shown in FIG. 6, the monitor unit 20 may include a latch unit 230 for holding a voltage signal indicative of the present mode of operation (e.g., normal mode=low level, backup mode=high level) for the SSPC. A logical OR circuit 240 receives the output of the latch unit 230 and an external backup signal (optional) in order to produce the output status signal.

The operation of the monitor unit 20 according to the embodiment of FIG. 6 will now be described. When the supervisory controller 10 is operating normally, it is configured to periodically send a refresh signal to the monitor unit 20. Thus, when the watchdog circuit 210 fails to receive the refresh signal at its regular interval, it resets the supervisory controller 10 via the reset signal. In response to the detected failure, the watchdog circuit 210 also latches its output state (using latch unit 230), and notifies other components in the SSPC of the failure via the status signal.

The latch circuit 230 holds the output state of the watchdog circuit 210 until it receives an appropriate clear signal from the filter mechanism 220. The purpose of the clear signal is to allow the supervisory controller 10 to be unlocked from failure mode after successful recovery is detected by the filter mechanism. Filter mechanism can be implemented either in hardware or in software, and may consider other criteria in addition to the clear signal in determining whether to restore normal functionality to the supervisory controller 10. The clear signal may originate from the supervisory controller 10. e.g., when successful recovery occurs. This gives the supervisory controller 10 the capability to take over control from the monitor unit 20 after recovery. After receiving the appropriate clear signal, the latch unit 230 restores normal operation output default level.

The latched signal is sent to the logical OR circuit 240, along with the external backup signal. Thus, either a detected failure in the supervisory controller 10 or an external initiation may cause the SSPC circuit to switch into backup mode as a result of the status signal output from the monitor unit 240. However, as mentioned above, the external initiation of backup mode is optional. Thus, inclusion of the logical OR circuit 240 and external backup signal in the monitor unit 20 of FIG. 6 is also optional.

Referring again to FIG. 2, the status signal may be sent to the enable unit 30, default storage unit 40, and selector unit 50. Thus, when backup mode of the SSPC 1 is to be initiated, either as a result of failure of the supervisory controller 10 or external initiation, each of the components 30, 40, and 50 are notified of this by the status signal. It should be noted that the status signal may comprise any combination of signals suitable for providing such notification.

However, in an alternative embodiment, it is contemplated that the status signal need not be responsible for notifying the various components of an external initiation of the backup mode. For instance, a different mechanism may be provided for notifying the enable unit 30, default storage unit 40, and selector unit 50, respectively that the backup mode has been initiated externally.

Referring again to FIG. 2, when backup mode of the SSPC 1 is invoked, the power switching channels are activated by the backup enable signals generated by enable unit 30 and controlled by the default commands stored in non-volatile memory device 44 to perform their respective power switching functions. Thus, redundant functionality is provided locally for the SSPC 1 apparatus of FIG. 2.

Furthermore, it is contemplated that an SSPC 1 as illustrated in FIG. 2 may be implemented as part of a secondary electrical power distribution system (SEPDS) of an aircraft, or another type of power distribution system.

It should further be noted that FIG. 2 is provided for purposes of illustration, and is not intended to be limiting on the present invention. Modifications and variations may be made to the configuration of the SSPC 1 illustrated in FIG. 2, as will be contemplated by those of ordinary skill in the art, without departing from the spirit and scope of the present invention. Also, it is not necessary for every component illustrated in FIG. 2 to be assembled on the same circuit board. As described above, it is contemplated that some of the illustrated components, such as the supervisory controller 10, could be located elsewhere.

Furthermore, it is noted that FIG. 2 provides a rather high-level illustration of the SSPC 1. Accordingly, FIG. 3 provides a block diagram illustrating a particular exemplary embodiment of an SSPC 1 with redundant functionality, consistent with the principles of the present invention.

FIG. 3 shows a particular implementation of the SSPC 1, which includes N power switching channels. Also, in FIG. 3, a microprocessor (μP) is implemented as the supervisory controller 10 of the SSPC 1. As discussed above, this microprocessor 10 may be assembled on the same circuit card as the other illustrated components. As such, the SSPC 1 may further include circuitry (not shown) for interfacing the microprocessor 10 to an external computer or device (not shown).

As shown in FIG. 3, the microprocessor 10 is connected to the default storage unit 40 via a serial bus 140. According to an exemplary embodiment, the default storage unit 40 includes a transceiver and digital potentiometer, which correspond to the interface unit 42 and nonvolatile memory device 44, respectively, of FIG. 2. Also, FIG. 3 shows that the enable unit 20 is comprised of a pulse generator, which ensures that the enable signals are generated with a sufficient pulse width as to enable the respective SSPC channels to execute their commands. According to an exemplary embodiment, the microprocessor 10, transceiver 42, potentiometer 44, and pulse generator 20 may comprise a series of integrated circuits powered by a common supply voltage Vcc.

The digital potentiometer 44 may include N programmable storage registers R1 ... RN, which correspond to the N power switching channels. Thus, for each SSPC channel #n ($1 \leq n \leq N$) in FIG. 3, a default command (D_CMD_n) may be programmed into the corresponding register Rn.

Figure 4:
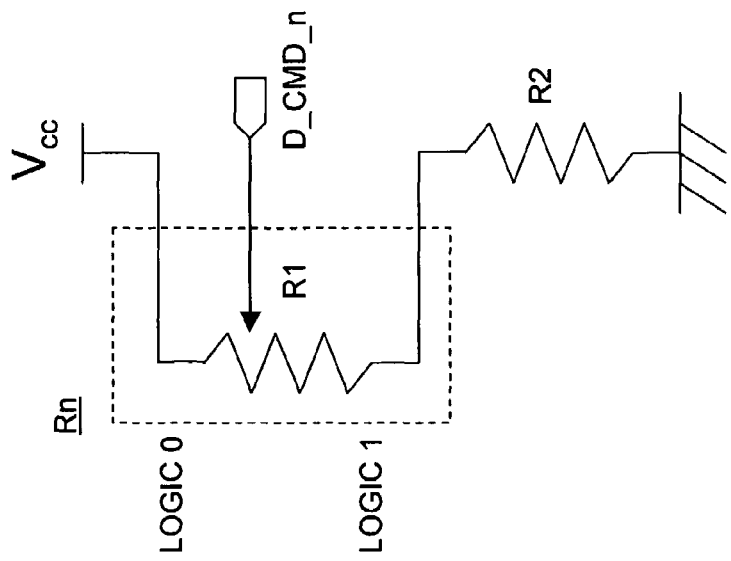
FIG. 4 is a block diagram illustrating a register in the nonvolatile memory, according to an exemplary embodiment of the present invention.

FIG. 4 illustrates the operation of a digital potentiometer as a nonvolatile memory device 44, according to an exemplary embodiment. As shown in this figure, the output of each potentiometer register Rn is configured as a resistive divider circuit. Specifically, the register Rn has a programmable resistance R1. The register Rn includes a pair of contacts, one being connected to supply voltage Vcc, the other being connected to a resistive load (of resistance R2).

As shown in FIG. 4, a digital value (e.g., logic 0 or logic 1) may be programmed into the register Rn to be stored as the default command D_CMD_n for the nth SSPC channel. Specifically, the voltage level of D_CMD_n is determined as:

$$\text{D\_CMD\_n} = Vcc \times \frac{R1}{R1 + R2} \quad \text{Eq. 1}$$

Assume that the supply voltage Vcc is 5.5V, R2 is 10 kΩ, and R1 has an adjustable range of 0 to 100. Thus, to program the default command at logic 1, the register RN can be set to resistance R1=100 k, thereby causing the output voltage level for D_CMD_n to be approximately 5.0V. Alternatively, to program the default command at logic 0, the register RN can be set to resistance R1=0Ω), thereby causing the output voltage level for D_CMD_n to be approximately 0.55 volts. It should be noted that the above-mentioned values are merely illustrative in nature, and that other values may be used as will be contemplated by those of ordinary skill in the art.

Referring again to FIG. 3, the selector unit 50 may be comprised of a set of N command-selecting circuits 50C, and N enable-selecting circuits 50E. As shown in this figure, each command-selecting circuit 50C selects between the command signal CMD_n from microprocessor 10 and the default command signal D_CMD_n from default storage unit 40, to be output to the corresponding SSPC channel (i.e., to ASIC #n). Similarly, each enable-selecting circuit 50E selects between the enable signal EN_n from microprocessor 10 and the backup enable signal B_EN_n from pulse generator 30, to be output to the respective SSPC channel. As shown in FIG. 3, the command-selecting circuits 50C and enable-selecting circuits 50E make these selections in accordance with the status signal.

An exemplary embodiment of the configuration and operation of each command-selecting circuit 50C will be explained further in connection with FIG. 5. As shown in this figure, the command circuit 50C for the nth SSPC channel includes a pair of buffers BUF_A and BUF_B for receiving the command signal CMD_n and default command signal D_CMD_n, respectively.

Figure 5:
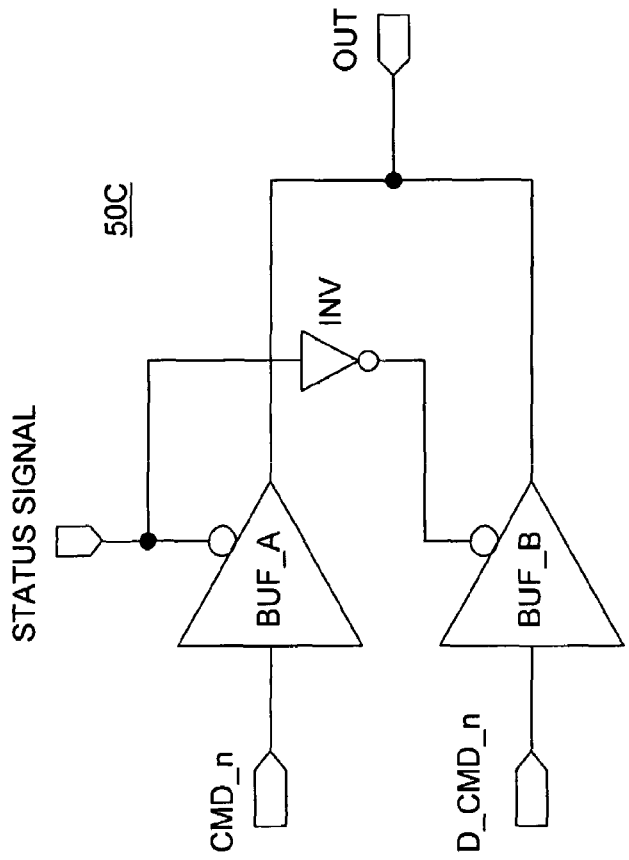
FIG. 5 is a schematic diagram of a command-selecting circuit, which selects between a command signal from the supervisory controller and a default command signal from the non-volatile memory device, according to an exemplary embodiment of the present invention.

FIG. 5 illustrates an embodiment in which the status signal is set to a low voltage level (logic 0) to indicate normal operating mode for the SSPC 1. Conversely, the status signal is set to a high voltage level (logic 1) to indicate backup mode.

Thus, during normal mode, the low-level status signal will not inhibit buffer BUF_A from releasing its contents (i.e., command signal CMD_n) to the output terminal OUT. Since the other buffer BUF_B receives an inverted version of the status signal, it will be inhibited from releasing its contents, i.e., default command signal D_CMD_n, to the output terminal OUT. Thus, the command signal CMD_n is selected for output.

However, when backup mode is initiated, the status signal transitions to a high-level. This inhibits buffer BUF_A from releasing the command signal CMD_n to the output terminal OUT. However, since buffer BUF_B receives the inverted version of the status signal, the default command signal D_CMD_n is released by buffer BUF_A to the output terminal OUT.

Of course, the configuration and operation described in FIG. 5 is merely illustrative. Other means may be used for selecting between command CMD_n and default command D_CMD_n, based on whether the SSPC 1 is operating according to normal or backup mode, as will be contemplated by those of ordinary skill in the art.

Although the command-selecting circuits 50C have been described above in connection with FIG. 5, it will be readily apparent to those of ordinary skill in the art that the enable-selecting circuits 50E may utilize a similar configuration and principle of operation.

Referring again to FIG. 3, various electrical isolation components 60 (e.g., opto-couplers or digital isolators) may be implemented to provide electrical isolation for interfacing the command signals CMD_n, default command signals D_CMD_n, and enable signals, respectively, to the ASIC of the corresponding SSPC channel. Otherwise, the operation of the other components (e.g., monitor 20, ASICS 110, and SSSDs 120) in this figure is similar to that described above in connection with FIG. 2.

Although FIG. 3 utilizes a digital potentiometer as the non-volatile memory device 44, this is merely an exemplary embodiment. It will be recognized by those of ordinary skill in the art that other configurations for the non-volatile memory device 44 may be implemented. For example, certain types of memory devices may be used in combination with a controller, which imparts non-volatile memory characteristics to the memory devices.

Although exemplary embodiments have been described hereinabove, it should be noted that modifications and variations may be made in connection therewith without departing from the spirit and scope of the present invention. Furthermore, the present invention contemplates the use of additional components or modes of operation in the SSPC 1 that would have been obvious to one of ordinary skill in the art.

What is claimed is:

1. An apparatus comprising:
   one or more electrical loads;
   one or more solid state switching devices, each configured to perform power switching functions for a respective electrical load of the one or more electrical loads, wherein each of the one or more solid state switching devices has a power switching function;
   a supervisory controller configured to issue commands to control the power switching functions of the one or more solid state switching devices;
   a nonvolatile memory device configured to store default commands, thereby providing a backup control circuit for the power switching functions of the one or more solid state switching devices; and
   a monitor device to determine whether or not the supervisory controller is functioning properly,
   wherein each electrical load is controlled in a desired state and wherein the default commands may either correspond to the commands most recently issued from the supervisory controller to the one or more solid state switching devices during normal mode, or correspond to a predetermined risk-abating configuration for the one or more solid state switching devices, such that the one or more solid state switching devices are locked into either an existing configuration, or a known safe configuration, when the supervisory controller is not functioning properly.

2. The apparatus of claim 1, wherein the one or more solid state switching devices perform the power switching functions according to a normal mode or backup mode, such that:
   in normal mode, the one or more solid state switching devices perform the power switching functions in accordance with commands issued by the supervisory controller, and
   in backup mode, the one or more solid state switching devices perform the default commands stored in the nonvolatile memory device.

3. The apparatus of claim 2, wherein the one or more solid state switching devices operate according to backup mode in response to the following conditions:
   detection of a fault with respect to the supervisory controller; and
   external initiation of the backup mode.

4. The apparatus of claim 2, wherein the default commands correspond to the commands most recently issued from the supervisory controller to the one or more solid state switching devices during normal mode, such that the one or more solid state switching devices are locked into an existing configuration when the backup mode is initiated.

5. The apparatus of claim 2, wherein the default commands correspond to a predetermined risk-abating configuration for the one or more solid state switching devices.

6. The apparatus of claim 1, wherein
   the supervisory controller transmits default commands to the nonvolatile memory device,
   the nonvolatile memory device is enabled to receive and store the default commands transmitted by the supervisory controller during normal operation of the supervisory controller, and
   the nonvolatile memory device is disabled from receiving and storing the transmitted default commands when a fault is detected with respect to the supervisory controller.

7. The apparatus of claim 6, wherein
   the nonvolatile memory device comprises a digital potentiometer,
   the digital potentiometer includes a register for each power switching channel, each said register being configured to store a default command for a power switching channel corresponding to said register.

8. The apparatus of claim 7, further comprising:
   a monitor device for monitoring the status of the supervisory controller and issuing a status signal in response to the monitoring,
   wherein the non-volatile memory device includes a transceiver interfaced to the supervisory controller, the transceiver being configured to receive the status signal,
   the transceiver is configured to allow transmission of default commands from the supervisory controller to the nonvolatile memory device when the status signal from the monitor device indicates normal operation of the supervisory controller, and
   transceiver is configured to block transmission of default commands from the supervisory controller to the nonvolatile memory device when the status signal from the monitor device indicates a detected fault with respect to the supervisory controller.

9. The apparatus of claim 8, wherein the digital potentiometer is further configured to read and transmit stored default commands from the nonvolatile memory device to the supervisory controller through the transceiver in response to an instruction signal from the supervisory controller.

10. The apparatus of claim 9, further comprising a serial bus connecting the supervisory controller to the digital potentiometer through the transceiver, the serial bus being configured to transmit default commands between the supervisory controller and the digital potentiometer through the transceiver.

11. The apparatus of claim 1, further comprising:
    a monitor device configured to enable online testing of the backup control circuit.

12. A power distribution apparatus assembled on a circuit board, comprising:
    a circuit board;
    a supervisory controller configured to issue commands and located on the circuit board;
    a nonvolatile memory device configured to store default commands thereby forming a backup control circuit and located on the circuit board;
    a monitor device to determine whether or not the supervisory controller is functioning properly; and
    one or more solid state switching devices, each configured to perform power switching functions for a respective electrical load, and located on the circuit board;
    wherein
       during normal operation, the one or more solid state switching devices perform the power switching functions in accordance with the commands issued by the supervisory controller, and
       in response to a fault detection of the supervisory controller, the one or more solid state switching devices perform the power switching functions in accordance with the default commands stored in the nonvolatile memory;

and wherein the default commands may either correspond to the commands most recently issued from the supervisory controller to the one or more solid state switching devices during normal mode, or correspond to a predetermined risk-abating configuration for the one or more solid state switching devices, such that the one or more solid state switching devices are locked into either an existing configuration, or a known safe configuration, when the supervisory controller is not functioning properly.

13. The apparatus of claim 12, further comprising a plurality of solid state switching devices corresponding to a plurality of power switching channels, wherein the nonvolatile memory device is a digital potentiometer with a plurality of registers, each register being configured to store a default command for a corresponding one of the power switching channels.

14. A secondary electric power distribution system (SEPDS) with backup functionality, comprising:

a local microprocessor for issuing power switching commands in accordance with instructions from an external master controller;

a non-volatile memory device configured to receive the power switching commands issued by the local microprocessor;

a monitor device configured to enable storing of the received power switching commands in the non-volatile memory device during a normal mode, and disable storing of the received power switching commands in the non-volatile memory during a backup mode;

enable online testing of the backup control circuit; and one or more solid state switching devices, each configured to: obtain power switching commands issued by the local microcontroller during the normal mode, obtain power switching commands stored in the non-volatile memory device during the backup mode, and selectively switch power on and off for a corresponding electrical load in accordance with the obtained power switching commands, such that each corresponding electrical load is controlled in a desired state when the supervisory controller is not functioning properly.

\* \* \* \* \*